(12) United States Patent
Worry et al.

(10) Patent No.: US 7,567,297 B2
(45) Date of Patent: Jul. 28, 2009

(54) TELEVISION VISUAL ARTWORK GENERATION SYSTEM AND METHOD

(75) Inventors: Michael Worry, San Jose, CA (US); Richard Storek, 16 Madrone Park Cir., Mill Valley, CA (US) 94941

(73) Assignee: Richard Storek, Mill Valley, CA (US)

( * ) Notice: Subject to any disclaimer, the term of this patent is extended or adjusted under 35 U.S.C. 154(b) by 560 days.

(21) Appl. No.: 11/170,282

(22) Filed: Jun. 28, 2005

(65) Prior Publication Data

US 2006/0104603 A1  May 18, 2006

Related U.S. Application Data

(60) Provisional application No. 60/584,465, filed on Jun. 29, 2004.

(51) Int. Cl.
*H04N 5/262* (2006.01)

(52) U.S. Cl. .................................................. 348/578
(58) Field of Classification Search ................. 348/578, 348/580–583, 239
See application file for complete search history.

(56) References Cited

U.S. PATENT DOCUMENTS

| | | | | |
|---|---|---|---|---|
| 4,868,652 A * | 9/1989 | Nutton | ..................... | 348/167 |
| 5,369,443 A * | 11/1994 | Woodham | ................. | 348/578 |
| 5,694,260 A * | 12/1997 | Houston | .................. | 359/850 |
| 6,473,114 B1 * | 10/2002 | Strubbe | ............... | 348/14.07 |
| 2006/0044322 A1 * | 3/2006 | Chen et al. | .............. | 345/593 |

* cited by examiner

*Primary Examiner*—Paulos M Natnael
(74) *Attorney, Agent, or Firm*—DLA Piper LLP (US)

(57) ABSTRACT

A television visual artwork generation system and method is provided that converts a television signal into a pattern/artwork that is displayed on a display.

26 Claims, 7 Drawing Sheets

A PATTERN OF TILED CELLS CREATES THE ENTIRE TEMPLATE FOR WHICH VIDEO IS PROCESSED. THE WALLS BETWEEN CELLS CAN BE ANY COLOR OR MAY CONSIST OF THE UNPROCESSED VIDEO SIGNAL.

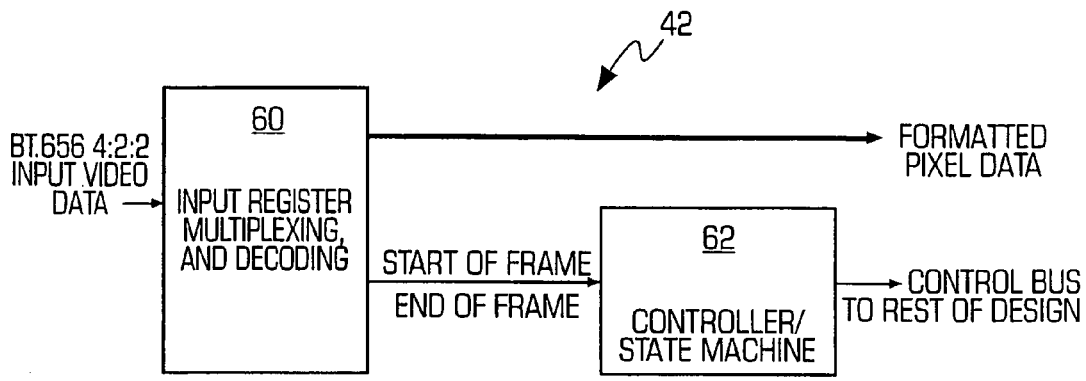
FIG. 6
| 31 | 28 27 | 20 19 | 6 5 | 2 1 | 0 |
|---|---|---|---|---|---|
| SHAPE NO. 72 | PIXEL COUNT 74 | 76 | LINE INDEX 78 | LAST LINE 80 | EOL 82 |
FIG. 7
| 31 | 28 27 | | 1 | 0 |
|---|---|---|---|---|
| NEXT SHAPE NO. 92 | | 94 | | EOF 96 |
FIG. 8
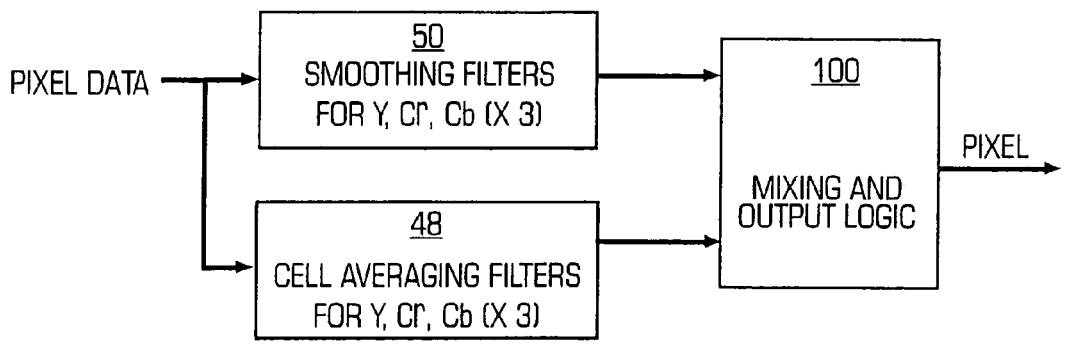
FIG. 9

TELEVISION VISUAL ARTWORK GENERATION SYSTEM AND METHOD

PRIORITY CLAIM

This application claims priority under 35 USC 119(e) and 120 to U.S. Provisional Patent Application Ser. No. 60/584,465 filed on Jun. 29, 2004 and entitled "Television Visual Artwork Generation System and Method" which is incorporated herein by reference.

FIELD OF THE INVENTION

The invention relates generally to a system and method for generating a pattern on a television and in particular to a digital system for converting a television signal into a visual artwork/pattern.

BACKGROUND OF THE INVENTION

A conventional system exists that permits the optical signals from a television to be converted into a visual display. As shown in FIG. 1, the system has a frame 12 adapted to be mounted in front of the screen of a television 11. The frame 12 has a translucent panel 13 that is held in place by hangers 15. The panel has a grid 16 made up of cell walls 21 in a pattern to define an array of open cells 22. In this system, the light emanating from the television tube enters a rear opening of the cell and is transmitted through the cell to impinge upon the translucent panel 13. In this system, the grid array of cells is altered which results in different visual images generated by the system. In particular, the shape of each cell in the grid may be altered. Although this system permits the optical signals from a television to be used to generate a visual display, the system has some significant disadvantages and limitations. First, the system requires a frame to be attached to the television which is cumbersome and requires the user to attach the frame to the television in order to achieve the desired visual effects. Second, since the system changes the optical signals generated by the television, the system can only provide a very limited range of visual effects unless the user changes the grid of cells in the array. Third, in order to watch the television, the user must remove the frame from the television. Thus, it is desirable to provide a system for generating visual artwork/effects on a television wherein the system alters the digital signals within the television so that the visual artwork/effects are displayed directly onto the television screen. It is also desirable to provide a system in which the user may switch between the visual effects/artwork mode and a normal television viewing mode quickly/easily. Thus, it is desirable to provide an improved television visual artwork generation system and method, and it is to this end that the present invention is directed.

SUMMARY OF THE INVENTION

The system is an electronic video transformation system that transforms video content into abstract or structured images with shifting, but appealing, chrominance and luminance values. The system may interrupt and transform an incoming video signal (analog and/or digital) and output the altered video signal to display real-time as pixilated grid/matrix. The system may have at least some pre-determined matrices (each matrix being different in appearance, from geometric-tiled to irregular) to be selectable via viewer controls wherein each matrix generates a different visual effect on the television screen. The viewer controls may be initially direct, but later via infrared (IR) remote or any other control technologies as the invention is not limited to any particular control technologies. In a preferred embodiment, a matrix subdivides a television field into a predetermined number, such as for example 80 to 120, of borderless cells wherein each cell may be uniform or varied in size/shape. The cells in each matrix may display the collective luminance/chrominance of contributing pixels within each cell field, adjusted for variance in luminance of those pixels (gradation from light to dark) within the cell field. The system may permit a transition between different matrices wherein the matrix selection transition may occur via pre-timed transition that may be controlled manually or semi-automatically. The system may be a device external to a television set or it may be incorporated into the television set. The system may also provide the user with additional display controls for overall chrominance, hue and contrast or other visual modifications, independent of existing television controls. The system may permit the user to enter pre-programmed additional or replacement matrix patterns, including text overlay, into the system. For example, the system may permit an advertiser to incorporate a corporate logo into the system in accordance with the invention.

BRIEF DESCRIPTION OF THE DRAWINGS

FIG. 6 illustrates more details of the input/control block shown in FIG. 5;

FIG. 7 illustrates an example of the data in the pattern memory for a particular pattern/matrix;

FIG. 8 illustrates an example of the next pattern index data in the pattern memory;

FIG. 9 illustrates more details of the digital filters shown in FIG. 5;

DETAILED DESCRIPTION OF A PREFERRED EMBODIMENT

The invention is particularly applicable to a television visual artwork/effects generating system and it is in this context that the invention will be described. It will be appreciated, however, that the system and method in accordance with the invention has greater utility, such as to other types of digital or analog display devices on which the visual artwork/effects may be displayed so that the invention is not limited to any particular type of display device.

Figure 1:
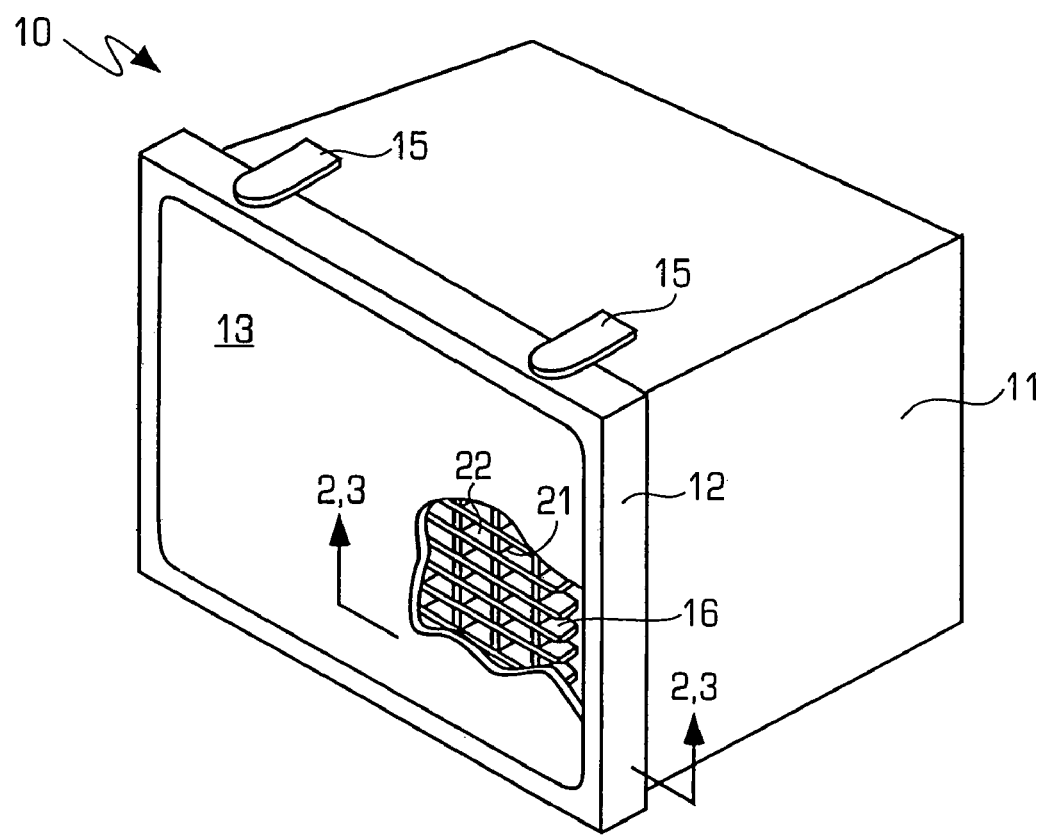
FIG. 1 is a diagram illustrating a conventional visual display system.
Figure 2:
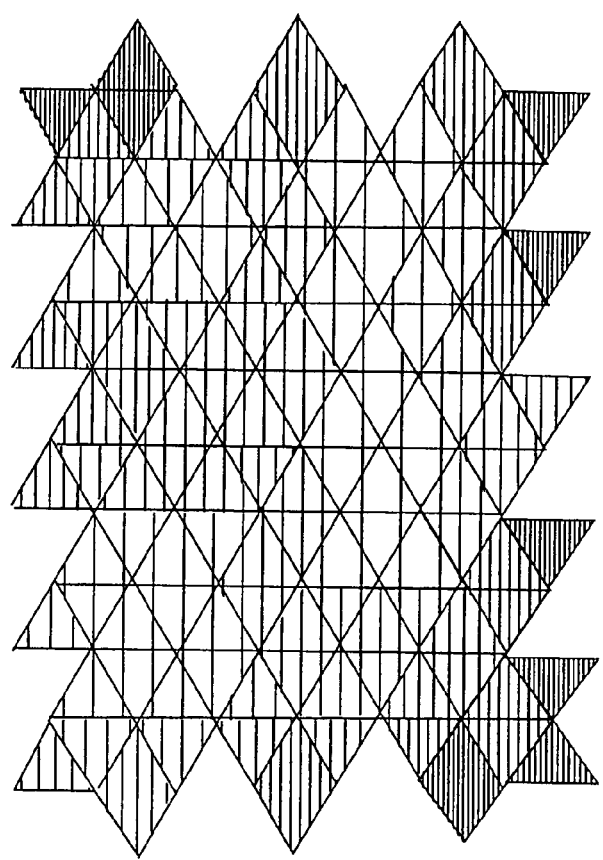
FIG. 2 illustrates two examples of the visual effects/artwork generated by the system in accordance with the invention.
Figure 2:
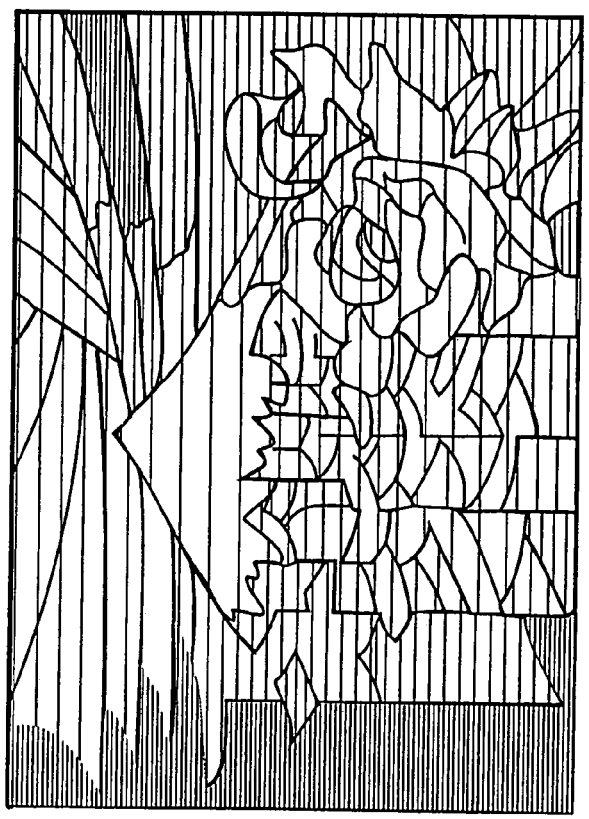
Figure 3:
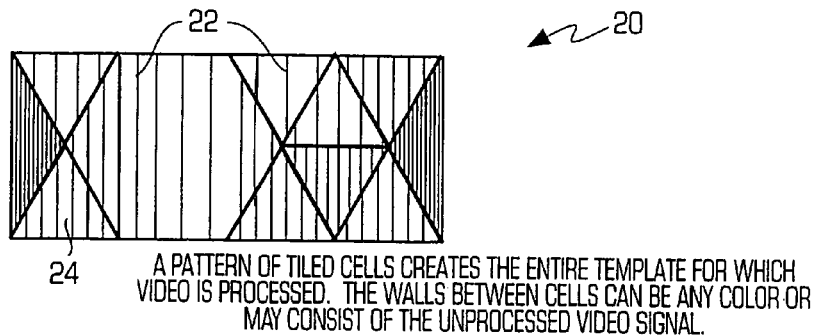
FIG. 3 illustrates an example of a portion of a matrix in accordance with the invention.

In accordance with the invention, the system is an electronic video transformation system that transforms video content into abstract or structured images with shifting, but appealing, chrominance and luminance values. An example of patterns generated by the system is shown in FIG. 2. The system may include one or more pieces of hardware and one or more pieces of software executing on the hardware that implement the system. In accordance with the invention, the output of the hardware shall be a real-time, digitally processed video stream based on the original video. The resultant image is comprised of a defined matrix (or pattern) of filtered, contiguous cells. FIG. 3 is an example of a portion of a matrix 20 that has a plurality of cells 22 tiled together. In this example, the cells 22 have different shapes/sizes. In a preferred embodiment, the matrix subdivides a television field into a predetermined number, such as for example 60 to 100, of borderless cells wherein each cell may be uniform or varied in size/shape. The cells in each matrix may display the collective luminance/chrominance of contributing pixels within each cell field, adjusted for variance in luminance of those pixels (gradation from light to dark) within the cell field. The system may permit a transition between different matrices wherein the matrix selection transition may occur via pretimed dissolve that may be controlled manually or semi-automatically. In accordance with the invention, the smaller cells 24 generally retain an averaged value of the video image within its area, while larger cells 26 tend to have chroma and luma gradients associated with them. The result is the pattern of tiled cells that is used to process the incoming video signals. The walls between the cells may be of any color or may consist of the unprocessed video signal (depending on the particular matrix or the viewer's controller choice.)

Figure 4:
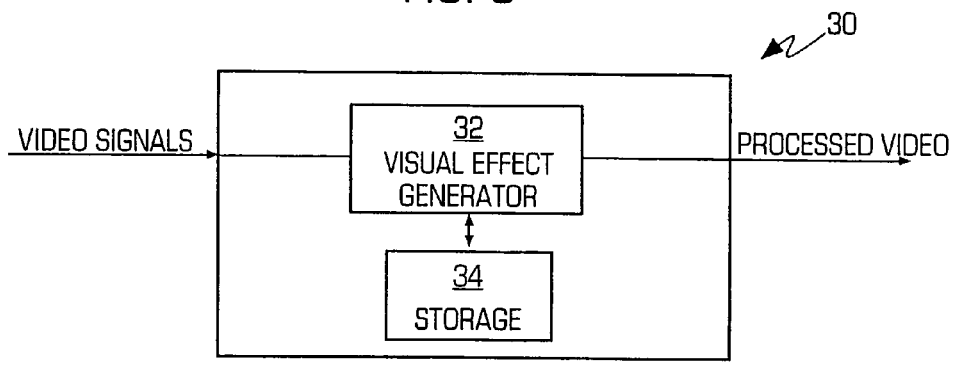
FIG. 4 is a block diagram illustrating a preferred embodiment of the visual effects generation system in accordance with the invention.

FIG. 4 is a block diagram illustrating a preferred embodiment of the visual effects generation system 30 in accordance with the invention. The system 30 may be implemented using a variety of different technologies. For example, the system may be implemented as a combination of hardware and embedded software or as purely software wherein the visual artwork method in accordance with the invention is a series of instructions that are executed by a processor, such as the processor in a television. In the example shown in FIG. 5 below, the system is implemented using a field programmable gate array (FPGA), a well-known memory, such as SRAM or DRAM and a well-known video encoder/decoder. As another example, the system may be implemented as an application-specific integrated circuit (ASIC). As another example, with the development of television systems with powerful processors inside of the television, the processor of the television may execute a plurality of lines of software code that implement the visual effect generation functions.

The system 30 may comprise a visual effect generator 32 and a storage unit 34 that is connected to the visual effect generator. In a hardware implementation of the system, the storage unit may be a typical memory device, such as a SRAM or DRAM. In a software implementation of the system, the storage unit may be an already existing memory device associated with a processor or a data structure. The system may receive a typical television video signal and generate processed video wherein the processed video is the resultant visual effects generated by the system based on the television video signal. The system 30 may further comprise a bypass block (not shown) that permits the incoming television video signals to bypass the visual effect generator so that the user is able to watch the normal television programming. For example, when the system 30 is deactivated, the normal television images will be shown. Advantageously, the system 30 permits the user to watch normal television without removing/disconnecting the system 30 unlike the prior system described above. Now, an example of an implementation of the visual effects generation system is described.

Figure 5:
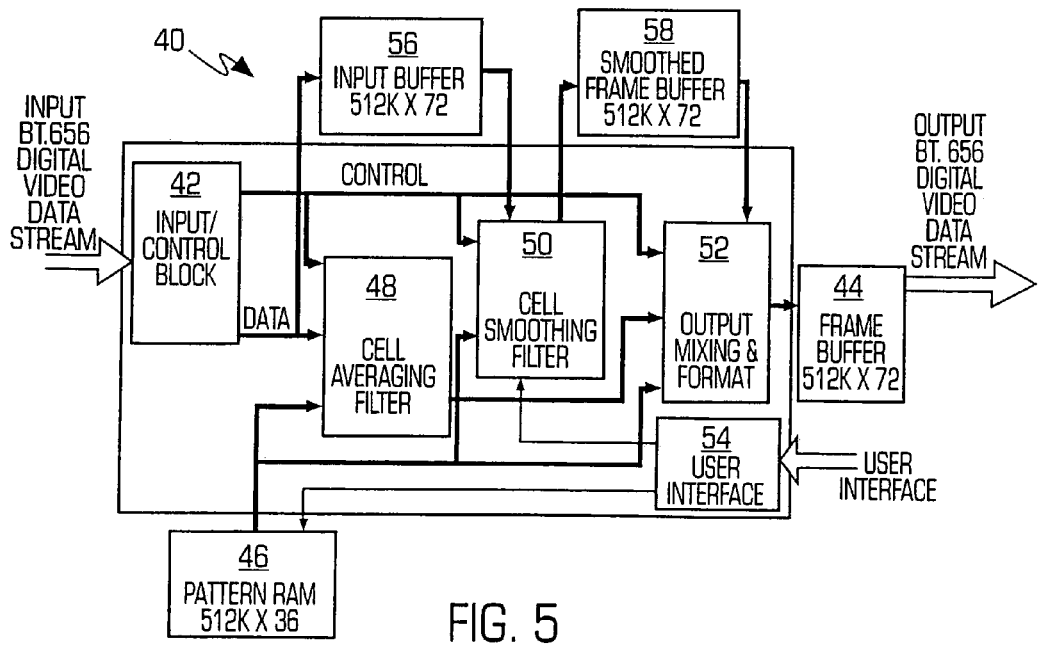
FIG. 5 is a diagram illustrating an example of a field programmable gate array (FPGA) implementation of the visual effects generation system in accordance with the invention.

FIG. 5 is a diagram illustrating an example of a field programmable gate array (FPGA) implementation 40 of the visual effects generation system 30 in accordance with the invention. In this example, the television video signals are encoded/decoded using the well known BT.656 standard which is described in more detail in Recommendation ITU-R BT.656-4, Interfaces For Digital Component Video Signals in 525-line and 625-line Television Systems Operating at the 4:2:2 Level of Recommendation ITU-R BT.601 (Part A) which is incorporated herein by reference and is available from http://www.itu.int/rec/recommendation. As shown, the FPGA first accepts the incoming BT.656 formatted video data in an input/control block 42 and processes it using digital filters, and frame buffers which are needed, in the exemplary bit-mapped design, to store partial incoming frames, smoothed video and output frames. The data is held in an output buffer 44 until it is forwarded to the video encoder in BT.656 format. In more detail, the FPGA further comprises a pattern memory 46, a cell-averaging filter 48, a cell-smoothing filter 50, an output mixing and format block 52 and a user interface block 54 that receives user input to the system. The FPGA also comprises an input buffer 56 and a smoothed frame buffer 58. As shown, the input/control block 42 may control the operation of the cell-averaging filter, the cell-smoothing filter and the output mixing and format blocks. The input/control block may also distribute the incoming data to the input buffer and the cell-averaging filter. The cell-averaging filter may also receive the pattern data (for the particular matrix) from the pattern memory 46. The pattern data may also be provided to both the cell-smoothing filter 50 and the output mixing and format block 52. The output of the cell-averaging filter may be provided to the output mixing and format block 52. The cell-smoothing filter 50 may receive data from the input buffer 56 and generate smoothed data that is stored in the smoothed frame buffer 58 and then onto the output mixing and format block 52. The user interface block 54 permits the user to update/control the pattern memory 46, such as adding a new matrix into the memory, and to control/update the cell-smoothing filter 50. Thus, in accordance with the invention, the video signal frames are processed such that: 1) current input pixels are smoothed with respect to their cell; 2) pixel values are accumulated with respect to their cell; and 3) smoothed frames are tinted according to the color and luminance values of their cells.

In the example shown in FIG. 5, a combination of the cell-averaging filter and the cell-smoothing filter are used. This effect is produced by mixing a smoothing filter approach with the cell-averaging concept, creating a smoothed, cell-dependent tint. However, the invention is not limited to that combination of filters. For example, the system may utilize only a cell-averaging filter that sums all the pixel luma/chroma values within a given cell, averages the values, and assigns each pixel the average pixel luma/chroma value. The system may also utilize a mean smoothing filter that takes an array, or window, of pixel values, slides across the screen and calculates pixel values based on its nearest neighbors. It is similar to cell-averaging but on a smaller scale, and with an array that is independent of a given cell's borders. The system may also utilize a skip and fill smoothing filter that drops pixels and replaces them by replication of remaining pixels. This skip and fill smoothing filter may also skip frames or lines with the effect to blur the image. The system may also use a gaussian or weighted smoothing filter which is similar to the mean filter, except that in calculating a single output pixel, the pixels that are farther away from a given pixel are weighted less than closer pixels. The system may also use only a cell-based smoothing filter that can be a mean or averaged filter or have weighted coefficients, however, it only takes into account pixels within a given cell area.

As shown in FIG. 5, the cell-based smoothing filter 50 and the luma and chroma cell-averaging filter 48 are applied in parallel to the incoming video data stream. The smoothing filter 50 may be configured as a mean or averaging filter first, but could be adjusted for weighted coefficients as well. For small cells, the smoothing results in an averaged luma/chroma value for the entire cell. For larger cells, if the pre-processed video mapped to that cell has varying luma/chroma, then the smoothing filter will create a spectral gradient across the cell. The filter's outputs are combined under user control to yield a result that is smoothed and tinted with the dominant color and luminance of the cell. The system is able to assign any given luma/chroma value to the pattern's border or unprocessed video may also be fed directly to the border.

An example of the pattern generated by the system shown in FIG. 5 is shown in FIG. 2. The FPGA 40 may also include the bypass functionality as described above. Further, the FPGA 40 (or more generally the system 30 shown in FIG. 4) may permit the user to download a new matrix (that generates a new/different pattern) or to make other changes to the system from an external source over a wireless or a wired connection. For example, the system 30 may permit the user to download the data over the Internet via a wireless or wired connection, download the data from a hard disk drive/flash memory type drive, download the data embedded into the existing television signal such as in the vertical blanking interval, download the data through an external device such as a DirecTV receiver or download the data to the system 30 from a local personal computer over a USB port.

FIG. 6 illustrates more details of the input/control block 42 shown in FIG. 5. The block 42 may further comprise an input register, multiplexing and Y,Cr,Cb decoding block 60 and a controller block 62. In a preferred embodiment of the invention, the controller block 62 governs the sequencing of the entire process via a finite state machine that controls the operation of the cell-averaging filter, cell-smoothing filter and the output mixing and format block as shown in FIG. 5. The input block 60 may detect the Start-of-frame (SOF), end-of-frame (EOF), start-of-active-line (SOAL), end-of-active-line (EOAL) signals from the incoming video signals and forward those signals onto the state machine. The state machine, using these signals, then sequences through states, applying control signals to downstream blocks to perform the required processing. The input block 60 also generates formatted pixel data that is forwarded onto the input buffer and the cell-averaging filter as shown in FIG. 5. The input control 60 can also smooth the image by dropping pixels, lines or frames when it writes the input buffer. The dropping of pixels is accomplished by replicating a pixel in memory where its neighbors would have been. Thus, a received pixel, for example, could be written to two or four memory locations to replace pixels in the stream that are dropped and the effect would be to blur the image.

The pattern memory 46 contains the definitions of the patterns to be applied to the video data. The pattern information is stored with a set of pattern entries per line. There is an entry in the memory for each pattern that appears in each line. For a frame of 525 lines, for example, if each line passed through 12 cells there would be 6300 entries in the pattern memory.

FIG. 7 illustrates an example of the data in the pattern memory for a particular pattern/matrix wherein an entry 70 is for a pattern of a line of video signals. The entry 70 is divided into one or more fields (including for example, a shape number field 72, pixel count field 74, an unused field 76 (that may be utilized for later use), a line index field 78, a last line field 80 and a end of line (EOL) field 82. The fields are used by the smoothing and averaging filters to control their processes with respect to the cell boundaries. The shape number field 72 is used by the tint filter to know which cell to assign the line's pixel values for Cy, Cb and Y. The pixel count field 74 is used by the arithmetic logic that totals the number of pixels in a cell. The Line Index field 78 may be used by the software that generates the pattern data should it not use successive location to store pattern entries. The last line field 80 contains a flag indicating that the data is the last line and the EOL field 82 contains an end of line flag that tells the controller 62 to access the next pattern memory location. When the Last Line and EOL flags are both set, the frame is complete. FIG. 8 illustrates an example of the next pattern index data 90 in the pattern memory that permits the controller to determine the starting address of the next line. The data 90 contains a next shape number field 92, a next pattern index field 94 and an end of file field 96. The values of the pattern memory are created by compiling a pattern with a software program that would scan each line of a frame and write an entry for each cell boundary encountered. The program would generate an entry when it arrived at a boundary on a line. Now, the digital filters in accordance with the invention will be described in more detail.

FIG. 9 illustrates more details of the digital filters 48, 50 shown in FIG. 5. In accordance with the invention, the digital filters perform smoothing and a cell-averaging on the Y, Cr, Cb planes and then mixed using a mixing and output logic 100. In accordance with the invention, there is a smoothing filter and a cell-averaging filter for each luminance and chroma value (Y, Cr and Cb) so that there is a total of 6 filters in this example. The filtered video data values are multiplexed to form the final output. Note that the mixing of the outputs from the cell-averaging filter and the smoothing filter can occur at various percentages.

Figure 10:
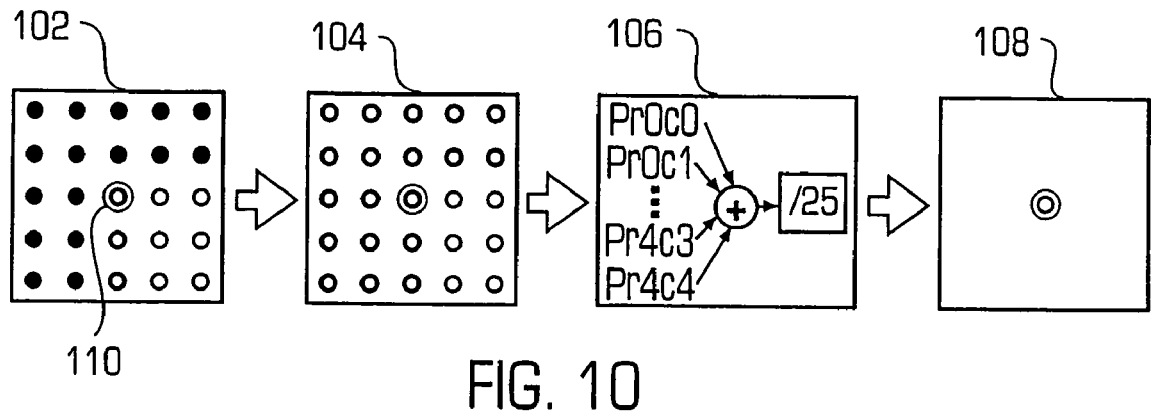
FIGS. 10 and 11 show more details of the smoothing method implemented smoothing filter in accordance with the invention.
Figure 11:
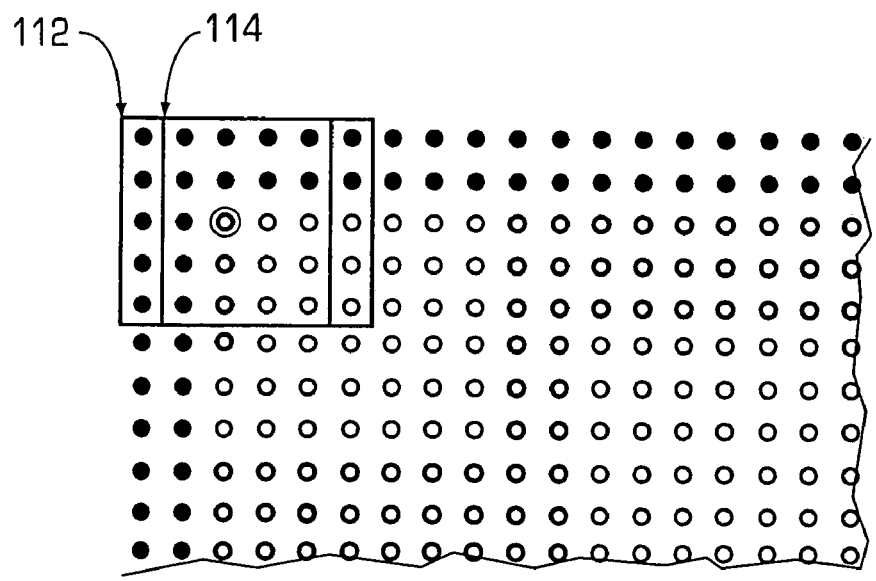

FIGS. 10 and 11 show more details of the smoothing method implemented smoothing filter in accordance with the invention. The smoothing filter 50 is based on an array centered on a pixel. As shown in FIG. 10, in step 102, a central pixel 110 in a first cell (at row 2 and column 2 (annotated as Pr2c2) is surrounded by an array of pixels (a 5×5 array in this example) centered on the central pixel. In accordance with the invention, the pixel data in the array is summed and divided (the chroma and luma values) in step 104, yielding an averaged value for the array area in step 106. Thus as shown in step 106, the method sums the pixel luma and chroma values in the array (25 values in the example shown) and then divides the result by the number of values to generate the averaged value. This value is then assigned to the centered pixel that is stored in the output frame buffer as shown in step 108. In accordance with the invention, a pixel value is calculated each clock.

The processing requires that as many lines as the array is deep are buffered and available in the input buffer shown in FIG. 5. In accordance with the invention, the size of the array is configurable. As shown in FIG. 11, a first array 112 is read from the buffer and processed to arrive at a value for the central pixel. The process is repeated for the next pixel array 114 by reading the next column of five pixels. When a row is complete it is added to the matrix and the top row shifted off. The filter may initially be configured as an averaging, or mean filter. However, in accordance with the invention, the mean filter could be given gaussian coefficients or any variety of weighting functions. Additionally, filter array size could be adjusted, as could the border replacement scheme.

In accordance with the invention, the smoothing filter must meet specific bandwidth requirements. In particular, the "standard" television today is NTSC BT.656. In BT 656, the full frame is 858×525 pixels, with 720×487 being active video or viewable video. Using a 16-bit interface with a 13.5 Mhz clock, there are 858 clock cycles per line, 858×525=450, 450 per frame (note, however, that there are only 720×487=350,640 active video pixels). In order to achieve real-time processing, the FPGA must then process a full frame at wire speed, meaning 720 samples per line at a 13.5 MHz clock rate, or 53.3 microseconds. Thus, a method of meeting bandwidth criteria includes skipping lines or pixels, parallel processing, clock multiplying in the video processor, pipelining and/or the use of dual-port RAMs. An example for achieving real-time throughput of the smoothing filter may include 1) accepting every 4th BT.656 pixel. With the 4:2:2 input specification, this will give us true Y, Cr, and Cb data for each accepted pixel (i.e. no Cr,Cb interpolation necessary). This will quarter our input rate in each direction, effectively dropping our input rate to one sixteenth, or from 13.5 Mhz, to 844 khz. The smoothing filter may also use a 15×15 array (which amounts to a 60×60 area since only every other pixel is used.) The smoothing filter uses 844 kHz×16~13.5 Mhz FPGA clock (slow)=74 ns so a nominal FPGA clock frequency of 50 MHz=20 ns is used. Given these constraints we can calculate the bandwidth as follows:

Min. bandwidth must be greater than 1/(450,450/13.5 Mhz)=1/33.4 mS=29.94 Hz $1^{st}$ pixel requires 15×15 clocks at 20 nS to read values out of RAM=4.5 us $5^{th}, 9^{th}$ ... $388,497^{th}$ pixels each require 15 clocks at 20 ns to read values of RAM=388,500/16×15×20 ns=7.3 ms.

Total Processing time is about 7.3 ms

Thus, bandwidth=1/7.3 ms=137 Hz>29.94 Hz Min Bandwidth Requirement.

Therefore, by dropping to using every fourth pixel in each dimension it gives us plenty of bandwidth to calculate this smoothing method and to, in the future, consider more complicated methods and also higher resolution standards such as HDTV.

Figure 12:
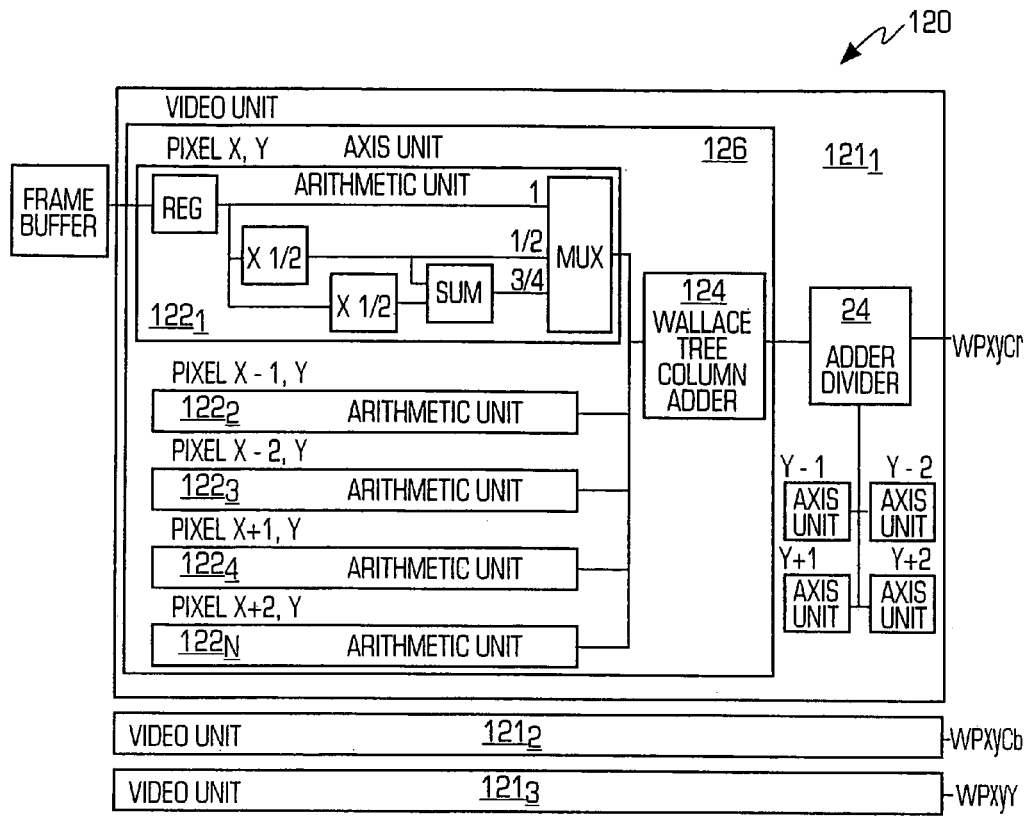
FIG. 12 illustrates an example of a weighted smoothing filter implementation.

FIG. 12 illustrates an example of a weighted smoothing filter 120 implementation that is a 5×5 matrix filter. In accordance with the invention, there are three of these filters running simultaneously for Y, Cr, and Cb comprising a first video unit $121_1$, a second video unit $121_2$ and a third video unit $121_3$. Not shown in this diagram is the control logic that reads the frame buffer memory, registers pixels, operates the multiplexers and arithmetic elements and stores the results to the smoothed frame buffer. In accordance with the invention, the method implemented by the smoothing filter 120 smoothes data by averaging the values of a pixel in a matrix with the values of neighboring pixels. When at least five lines are stored in the buffer the second phase of smoothing may be performed by the smoothing block. The smoother averages the values of Y, Cr and Cb for each pixel by summing its values with 75% of the corresponding values of its eight immediate neighbors and with 50% of the values of the 16 pixels that are one pixel further away from center. The averaging is performed on each pixel by reading the next column of pixels and averaging all 25 values simultaneously in combinatorial arithmetic logic. With pipelining the system should process a pixel every clock.

At the end of a row the process repeats by dropping the uppermost line and adding the next line down. Pixels are accessed from memory by incrementing the address counter. Pixel coefficients are adjusted by multiplexing the pixel value so that all the five values of a row arrive at a well known Wallace Tree adder 124 simultaneously. They are then summed with the row values of five columns and the entire sum divided by 24. That value is written to the Smoothing buffer. The values of 50% and 75% are used due to ease of calculation. The first is derived simply by dropping the LSB, shifting the remaining bits down, and using a zero for the MSB. The 75% value is derived by repeating the previously described process again to find 25%, then adding 50% and 25% together. By similar means other fixed coefficients may be used. When a cell boundary is encountered during processing, the registered value of the central pixel is substituted by multiplexing for those of pixels that lie across the boundary so that smoothing is performed with respect to cell boundaries. In FIG. 12, the filter is shown hierarchically with an arithmetic unit $122_{1-N}$ at the lowest level performing the calculation for a pixel value. Five arithmetic units form an axis unit 126 that operates on five x-axis pixels. The five are summed with the Wallace Tree adder 124. Four additional Axis units, operating on the y-axis above and below the first axis unit form a video unit whose sums are divided by 24 to average over the array of twenty-five pixels. In this example, twenty-four is used as an approximation because it requires less logic. The two additional video units $121_2$, $121_3$ support the same operation on the Y and Cb planes.

Figure 13:
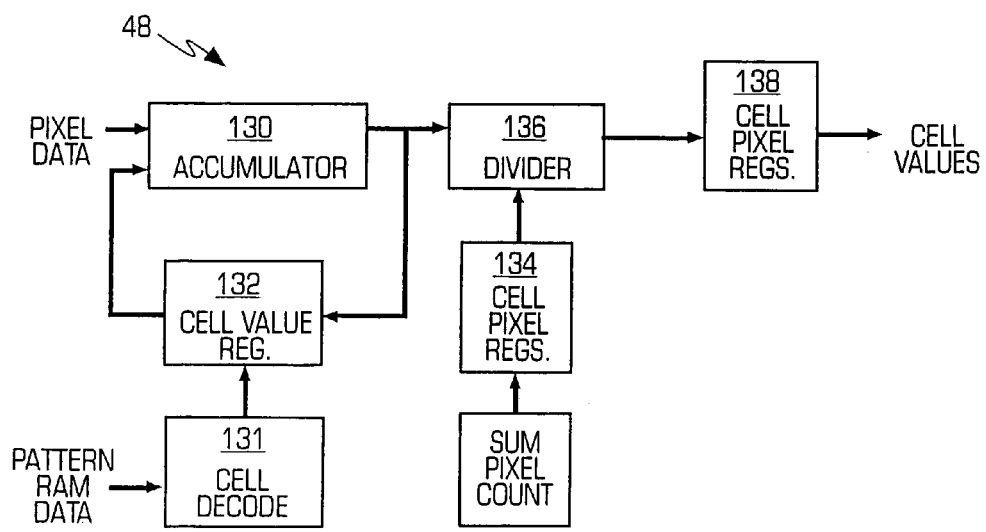
FIG. 13 illustrates more details of the cell-averaging filter 48 shown in FIG. 5.

FIG. 13 illustrates more details of the cell-averaging filter 48 shown in FIG. 5. The cell-averaging filter operates in parallel with the smoothing filter. The averaging filter adds the luma/chroma values of all the pixels in a given cell area, then divides by the number of pixels in that cell to find an average pixel value or tint for the cell. That value is calculated in parallel with the smoothing operation and applied to the smoothed data under user control to produce a smoothed, tinted and bordered pattern. In accordance with the invention, video data is processed for Y, Cr and Cb for each byte. The pixels drive an accumulator 130 which totals the values for all the pixels in a cell. An averaging controller (shown at a cell decode 131) reads the pattern memory descriptor for the line and cell and the descriptor tells the controller how many pixels wide the cell is for that line. The values of the pixels in each cell and each line are summed in the accumulator 130. When the incoming pixel count reaches that number on pixels in the line for the cell, the controller stores the accumulated values in a register 132 for the cell and reads the pattern memory again for the next cell. The process repeats until the end of the line. After processing the last pattern entry for a line the controller reads the next location to know the address of the first cell descriptor for the next line.

The number of all the pixels in the cells of the frame is stored in a cell pixel count register 134. When the frame is complete, the registered color values each cell are calculated by dividing (using a divider 136) the aggregate cell values by the total of pixels in the cell stored in the Cell Pixel registers. The result is the value to be applied to the cell and is stored in a cell pixel register 138.

Figure 14:
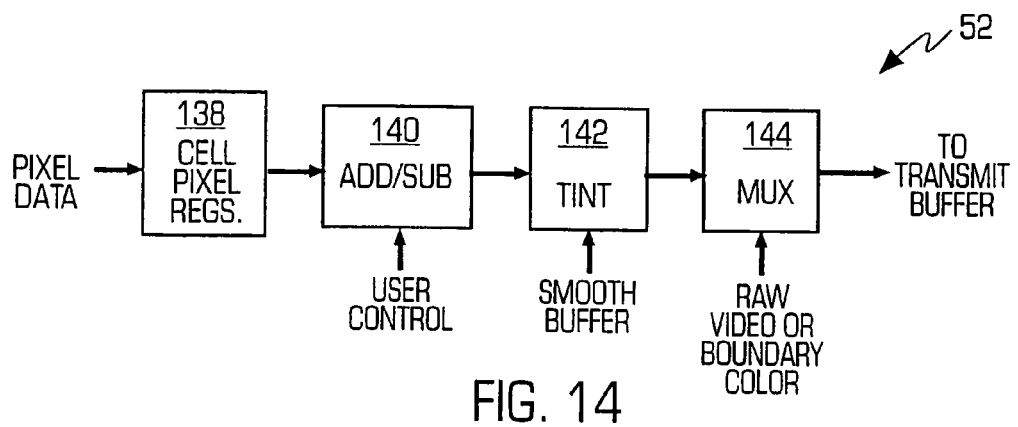
FIG. 14 shows more details of the output/mixing block.

FIG. 14 shows more details of the output/mixing block 52. The output block 52 may further comprise the cell pixel registers 138, an adder/subtractor unit 140, a tint block 142 and a multiplexer 144. The cells of a smoothed frame are tinted by the values for the cell stored in the cell pixel registers 138. The amount of tint can be modified by adding or subtracting the amount of tint under user control using the adder/subtractor unit 140. The tint is applied to data read from the smoothed frame buffer and written to the output buffer. When a cell boundary is reached boundary colored or raw video is multiplexed by the multiplexer 144 and written to the buffer by an output state machine in the output/mixing module 52. Various ways of tinting are available. For example, the data could be time mixed or the average color could be directly mixed with the smoothing value on a per pixel basis. The mixing can also be disabled if only one filtering output is preferred.

The processed pixel data is forwarded to the video encoder. Before being forwarded, the user may alter the presentation of video data. For example, when a pattern changes via the user interface, a fade-out-and-back-in function could be generated. The user interface could also disable the visual effects mode by selecting the bypass channel. Other user interface mixing such as overall contrast, brightness, etc. could also be implemented in this portion of the block. Finally, the pixel stream is reformatted with blanking times and is sent to the video encoder in BT.656 format.

As set forth above, the television artwork generation system and method in accordance with the invention may be implemented as a piece of hardware that includes embedded software and firmware executed by the hardware to implement various functions and operations of the system. For example, the system may permit the user to freeze a processed frame, rewind a processed frame, provide users with the ability to download a processed frame, displaying an underlying image of a processed frame under user control, change the filter pattern on a frozen image, adjust the frame rate output, smooth the output frame with the same pattern, or morphing to a new pattern or matrix.

To freeze the processed output frame (and enter a "paused mode"), the user may, from an infrared remote or other control device, freeze or pause the current Telefire image. To accomplish this, a control circuit in the device would continue to output the image from the last frame buffer in the Telefire process. The incoming active video would be dropped while the user observes the still image.

The system may also permit the user to rewind the image or/and save and call up the image just "created." While in the paused mode, the user would be able to rewind through recently outputted Telefire frames. To accomplish this, the preferred embodiment would add a video FIFO to the system. Since the processed frames are likely output at less than 30 Hz frame rate, it would be possible to achieve a multiple on the stored frames versus the timeframe. For example, one second of stored video frames at a traditional 30 Hz frame rate could represent 30 seconds of Telefire stored video at a 1 Hz frame rate. The video FIFO could be instantiated as an off-chip FIFO, a DRAM with a dual port memory controller, or potentially an external memory interface such as compact flash, memory stick or smart media card.

The system may also permit users the download processed frame or a sequence of frames for external distribution. In one example, the Telefire unit could watermark the image with "Telefire" in the corner for marketing purposes. Depending on the embodiment, this could be an Internet download through an IP aware Telefire, a plug in compact flash, memory stick or smart media card, or a link to an external video recorder.

The system may also permit the user to display the underlying image of the processed frame under user control. Thus, the user would have the ability, via an infrared remote or other control device, to display the original video source that generated the current processed frame. The Telefire process captures the incoming active video into an incoming video frame buffer (See element 42 in FIG. 5.) Using a pipelined process, each video still is processed through the Telefire process into the output image. Thus, switching between the source or processed image would be accomplished by adding a video multiplexer that could pull from either the input frame buffer or an output frame buffer. This functionality could be used either in active video mode or paused mode.

The system may also permit the user to change pattern filter on a frozen image. For example, while the user is in paused mode, the user would be able to change the pattern, or matrix, used in the Telefire process. The user then could cycle or "surf" through a variety of patterns seeing how each would effect the frozen image. This would be accomplished by keeping the frozen source image in the input frame buffer, then processing it as usual through the Telefire circuitry each time the pattern is changed.

The system may also generate a different kind of image from a user-chosen still image wherein the user captures or enters a photo, and processes it with a method that looks at visual information within his image, especially the outer zone and edges and surrounds that original with a visual "extension", as we do with the Storek Studio watercolors. See www-.storekstudio.com examples. This might be PC-based, or processed in a mobile device, not involving television. It may require the ability to generate discrete cells as the image proceeds out from the original image edges.

The system may also permit the user to adjust the output video frame rate. A fast frame rate processes the active video source at wire speed, capturing every frame, but can produce a processed output that is jarring or flickering. In general, users will want to slow and smooth the output display. The simplest way to approach this is to process intermittent frames of the incoming active video that may be implemented in the software/firmware of the system.

The system also permits the smoothing of an output frame with the same pattern so that, under user selection, the Telefire process would fade from one processed frame to the next. To accomplish this would require two output frame buffers (one frame buffer 44 is shown in FIG. 5, but the system may be implemented with two output frame buffers), one that holds the most recent output image, and another that holds an image one processed frame older. The actual output stream would fade from the older image to the newer image. This would be done by a linear pixel fade of luminance and chrominance as is well known and may be implemented in software.

The system may also permit morphing to a new pattern or matrix so that, under user selection, the Telefire process would switch from one applied pattern to a different applied pattern. The switch could either be done as an instant replace, a pixel fade, or as a pattern morph. To accomplish a pattern morph, each cell in the new and old pattern is numbered. The process calculates the percentage overlap of a new cell with existing cells. Above a certain percentage overlap, the existing cell is absorbed into the new cell. The new cell could absorb multiple existing cells. If an existing cell straddles several new cells, it will be split between the new cells. To accomplish the morph, each cell is broken down into a series of vertices, connected either by a straight line or an arc. Absorbed cells moved their vertices together and become part of a larger entity. Broken cells add additional vertices to "pinch off" the existing cell into new multiple cells.

The pattern morph can be broken down into seven stages: 1) number cells in both patterns, 2) measure overlap between cells, 3) determine cell mapping, 4) establish circumference vertices for each cell, 5) calculate vertex distances, 6) determine vertices mapping, and 7) increment source to destination two dimensional vertices.

Figure 15:
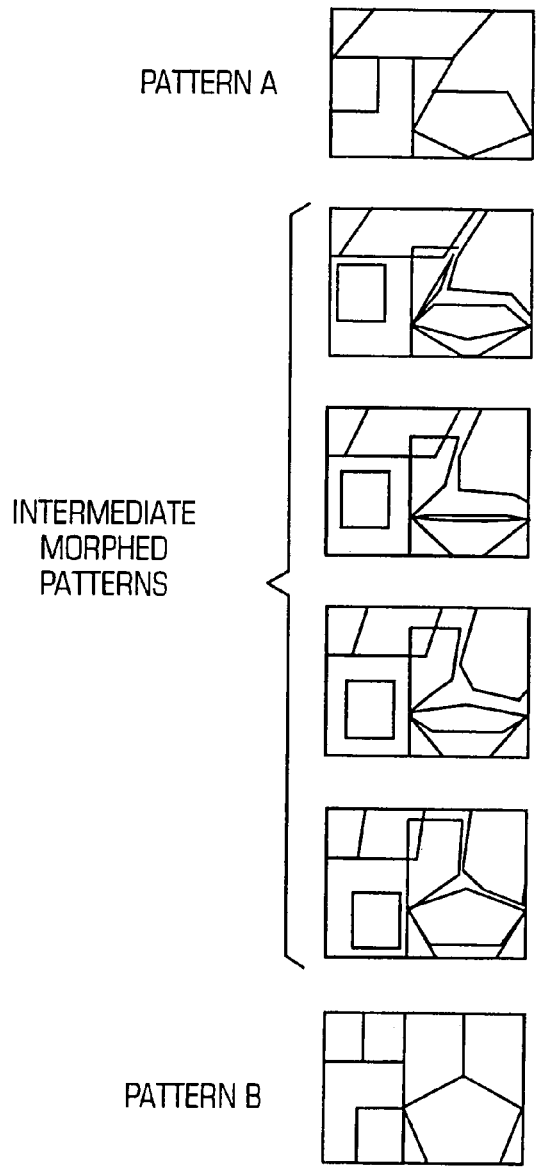
FIG. 15 depicts an exemplary type of morphing that could be done between two patterns.

FIG. 15 depicts an exemplary type of morphing that could be done between two patterns. Pattern A is the initial pattern (also referred to as the source pattern), and Pattern B is the new pattern (also referred to as the destination pattern). The Telefire calculates the intermediate pattern stages and continues to process active video in these cells as the pattern morphs from one to the other.

On a pixel by pixel basis, each of the source pattern cells are measured against the destination pattern cells. The percentage overlap is measured to determine the cell mapping. The table below has the destination cells in the columns, and the source cells in the rows. The percentage represents the percentage of that destination cell which comes from that source cell. Table 1 is an exemplary table and is not calculated to map to FIG. 15.

TABLE 1

Exemplary Percentage Overlap between Source and Destination Cells

|  | Dest 1 | Dest 2 | Dest 3 | Dest 4 |
|---|---|---|---|---|
| Source 1 | 100% |  | 90% |  |
| Source 2 |  | 80% |  |  |
| Source 3 |  | 20% |  | 50% |
| Source 4 |  |  | 10% | 50% |

Once the percentage overlap is calculated, cell mapping is determined. Cell mapping refers to how the source cells are mapped to the destination. For illustrative purposes, we use the threshold of 70% or above to represent a destination cell which comes fully from a single source. In Table 2, a destination cell that comes fully from a single source is marked with an "X".

TABLE 2

Exemplary Cell Mapping Table

|  | Dest 1 | Dest 2 | Dest 3 | Dest 4 |
|---|---|---|---|---|
| Source 1 | X |  | X |  |
| Source 2 |  | X |  |  |
| Source 3 |  |  |  | X |
| Source 4 |  |  |  | X |

In the example of Table 2, source cell 1 will be split to destination cell 1 and destination cell 3. Source cell 2 maps one to one to destination cell 2. Source cells 3 and 4 are combined to form destination cell 4.

Each cell is assigned vertices around the circumference. Cells that are to be split have many vertices and cells that are to be combined have few vertices. In an exemplary embodiment where each destination cell has 128 vertices, the vertex count could be as shown in Table 3.

TABLE 3

Exemplary Vertex Count

| Cell | Vertex count | Comment |
|---|---|---|
| Dest 1 | 128 |  |
| Dest 2 | 128 |  |
| Dest 3 | 128 |  |
| Dest 4 | 128 |  |
| Source 1 | 256 | Split into Dest 1 and Dest 3 |
| Source 2 | 128 | Maps to Dest 2 |

TABLE 3-continued

Exemplary Vertex Count

| Cell | Vertex count | Comment |
|---|---|---|
| Source 3 | 64 | With Source 4, maps to Dest 4 |
| Source 4 | 64 | With Source 3, maps to Dest 4 |

A table is then built to generate a two dimensional matrix of every possible source vertex to every possible destination vertex. The distance is measured in pixels, and Table 4 is an example of such table.

TABLE 4

Exemplary Matrix of Distance from Source Vertex to Destination Vertex

| Source Cell | Dest Cell | Source Vertex | Dest Vertex | Distance |
|---|---|---|---|---|
| 1 | 1 | 1 | 1 | 5 |
|  |  |  | 2 | 3 |
|  |  |  | ... |  |
|  |  |  | 128 | 52 |
|  |  | 2 | 1 | 3 |
|  |  |  | 2 | 4 |
|  |  |  | ... |  |
|  |  |  | 128 | 49 |
|  |  | ... |  |  |
|  |  | 256 | 128 | 52 |
| 1 | 3 | 1 | 1 | 5 |
|  |  |  | 2 | 3 |
|  |  |  | ... |  |
|  |  |  | 128 | 10 |
|  |  | 2 | 1 | 4 |
|  |  |  | 2 | 8 |
|  |  |  | ... |  |
|  |  |  | 128 | 12 |
|  |  | ... |  |  |
|  |  | 256 | 128 | 15 |
| 2 | 2 | 1 | 1 | 5 |
| Etc. |  |  |  |  |

As seen in Table 4, each source cell vertex maps to exactly one destination cell vertex.

A minimum length process is run to calculate the mapping which results in the least movement of all vertices. There are a number of ways this could be accomplished. One approach would be to calculate the minimum distance of all source vertices, sort the distances in ascending order, and take the highest number. This would give priority routing to the vertices that are forced to travel the farthest. The destination vertex would then be removed from the routing list, the list would be resorted, and the same process would be repeated with the next pair.

Once the minimum length process is run, it is known exactly which destination vertex each source vertex is headed for. The process then steps from the source x, y coordinates to the destination x, y coordinates in the predetermined number of steps. For a 30-hertz refresh rate and a three-second pattern morph, this would be in 90 steps.

While the disclosure has been directed towards NTSC broadcast video arriving at a television, the process is applicable towards a wide range of video standards. With the increasing use of compressed streaming video over packet networks, standards such as MPEG-4 and H.264 are becoming increasingly popular. In these instantiations, the Telefire process has a unique opportunity to modify the codec directly. The advantage of such a modification is that a relatively small code change, with no incremental need for hardware or processing whatsoever, could produce dramatic visualization techniques. One embodiment would be to modify the "I frame" of an H.264 stream, while leaving the motion estimation, or P and B frames, unchanged. The I frame could be modified by something similar to the traditional Telefire pattern process, while the temporal motion frames would add incrementally and visually interesting information before the arrival of the next I frame.

The system may also permit image extension. In particular, the user could generate a new image extended from a user-chosen still image. The still image could either be captured from a stream of video, or selected as an existing still image. The process surrounds the original still image with a thick border, making the original image the "seed" at the center of a now larger image. The process then looks at visual information within the still image, especially the outer zones and edges and surrounds the original image with a visual "extension". This image extension may be instantiated within the existing Telefire embedded system, however it would be a different processing method. There would also be the potential for this to be an image manipulation, or video filter, running on a PC (Personal Computer), or perhaps a website. A further potential implementation would be in a cell phone or PDA with an embedded camera. A captured photo could quickly have an enhancing visualization added, and then either stored or transmitted.

The system may utilize color extension to implement the image extension. The simplest approach would be to simply extend the colors at the edge of the original photo which may be suitable for a device with low processing capability, or for a situation where the added "border" is relatively thin. Another approach to implement image extension would be around the outer zone of the original photo, use an edge detection process to detect color, gradient, or line transitions. These lines could then be extended into the added border and used as demarcation of discrete cells for potential further processing. In another approach to implement image extension, the process compares the original image to a database of potential backgrounds. A background is chosen based on color or edge matching and phased in to extend the original photo. The user would also have the ability to chose their selected background for a selected photo. For example, a user could take pictures in his backyard, and then fade in a background of a beautiful beach in Hawaii and email to relatives. Yet another approach to implement image extension is a visualization process in which the new border is filled in with a method that organically grows each new ring based on a calculation of the proximal pixels in the last ring.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A method for generating a visual effect on a television, comprising:
   receiving an incoming television signal;
   performing one or more filtering operations on the incoming television signal in order to generate an altered television signal, the one or more filtering operations further comprising a cell-averaging operation and a cell-smoothing operation that are performed simultaneously for each pixel of the television signal; and
   outputting the altered television signal to a television to display the altered television signal.

2. A device, comprising:
   a storage unit;
   a visual effects generator connected to the storage unit that alters an incoming television signal in order to generate a visual effect that is stored in the storage unit and then displayed on a television, wherein the visual effect further comprises a matrix comprising a plurality of filtered contiguous cells, the visual effects generator further comprises a digital filter that alters the incoming television signal based on a pattern stored in the storage unit; and
   a bypass unit that permits the incoming television signal to be displayed without alteration when the visual effects generator is not active.

3. The device of claim 2, wherein the matrix subdivides the entire television viewing area.

4. The device of claim 2, wherein the matrix further comprises between sixty and one hundred cells.

5. The device of claim 2, wherein each cell in the matrix further comprises a cell luminance and a cell chrominance wherein the cell luminance corresponds to a collective luminance of one or more pixels from the incoming television signal within the cell and the cell chrominance corresponds to a collective chrominance of one or more pixels from the incoming television signal within the cell.

6. The device of claim 5, wherein the digital filter further comprises a cell-averaging filter that averages the chrominance and luminance of the pixels that are part of a cell.

7. The device of claim 6, wherein the digital filter further comprises a cell smoothing filter that determines the cell luminance and cell chrominance using a window of pixel values within the cell.

8. The device of claim 2, wherein the storage unit further comprises a pattern memory containing a pattern that is used to generate the matrix.

9. The device of claim 8, wherein the digital filter receives the pattern from the pattern memory to generate the matrix.

10. The device of claim 9, wherein the digital filter transitions between a first pattern and a second pattern contained in the pattern memory.

11. The device of claim 10, wherein transitioning between the first pattern and the second pattern comprises measuring an overlap between the first pattern and the second pattern.

12. The device of claim 10, wherein transitioning between the first pattern and the second pattern comprises mapping the first pattern to the second pattern based on an amount of overlap between the first pattern and the second pattern.

13. The device of claim 10, wherein transitioning between the first pattern and the second pattern comprises:
   establishing vertices for the first pattern and the second pattern; and
   calculating distances between one of the vertices for the first pattern and one of the vertices of the second pattern.

14. The device of claim 13, wherein transitioning between the first pattern and the second pattern further comprises selecting a mapping that results in a least movement of all vertices.

15. The device of claim 10, wherein transitioning between the first pattern and the second pattern comprises:
   establishing vertices for the first pattern and the second pattern; and
   moving from the vertices for first pattern to the vertices for the second pattern in a predetermined number of steps determined based on refresh rate.

16. The device of claim 10, wherein transitioning between the first pattern and the second pattern comprises:

measuring an overlap between the first pattern and the second pattern;

mapping the first pattern to the second pattern based on the overlap;

establishing vertices for the first pattern and the second pattern; and calculating distances between one of the vertices for the first pattern and one of the vertices of the second pattern;

selecting a mapping that results in a least movement of all vertices; and moving from the vertices in the first pattern to the vertices in the second pattern in a predetermined number of steps determined based on refresh rate.

17. The device of claim 2, wherein the digital filter further comprises a mean smoothing filter.

18. The device of claim 2, wherein the digital filter further comprises a skip and fill smoothing filter.

19. The device of claim 2, wherein the digital filter further comprises a weighted smoothing filter.

20. The device of claim 2, wherein the digital filter further comprises a cell smoothing filter.

21. The device of claim 2 further comprising a user interface unit that permits the downloading of a new pattern.

22. The device of claim 21, wherein the new pattern is downloaded from a signal embedded into the incoming television signal.

23. The device of claim 21, wherein the user interface permits the freezing of the visual effect.

24. The device of claim 21, wherein the user interface permits the rewinding of the visual effect.

25. The device of claim 21, wherein the user interface permits the display of the incoming television signal.

26. A device, comprising:

a storage unit;

a visual effects generator connected to the storage unit that alters an incoming television signal in order to generate a visual effect that is stored in the storage unit and then displayed on a television, the visual effects generator further comprises a digital filter that alters the incoming television signal based on a pattern stored in the storage unit; and a bypass unit that permits the incoming television signal to be displayed without alteration when the visual effects generator is not active.

* * * * *